(12) United States Patent
Khalessi et al.

(10) Patent No.: US 6,633,900 B1
(45) Date of Patent: Oct. 14, 2003

(54) MOBILE CREW MANAGEMENT SYSTEM FOR DISTRIBUTING WORK ORDER ASSIGNMENTS TO MOBILE FIELD CREW UNITS

(75) Inventors: Amir Khalessi, Cary, NC (US); Sasan H. Ardalan, Cary, NC (US)

(73) Assignee: ABB Inc., Raleigh, NC (US)

(*) Notice: Subject to any disclaimer, the term of this patent is extended or adjusted under 35 U.S.C. 154(b) by 0 days.

(21) Appl. No.: 09/509,100

(22) PCT Filed: Jan. 8, 1999

(86) PCT No.: PCT/US99/00497
§ 371 (c)(1),
(2), (4) Date: Apr. 26, 2000

(87) PCT Pub. No.: WO99/35549
PCT Pub. Date: Jul. 15, 1999

(51) Int. Cl.[7] .................. G06F 15/16; G06F 15/173; H04H 1/00; H04B 7/24
(52) U.S. Cl. .................. 709/202; 709/201; 709/223; 709/224; 455/3.01; 455/39
(58) Field of Search ................. 709/202, 223, 709/201, 224; 455/3.01, 39

(56) References Cited

U.S. PATENT DOCUMENTS

| | | | |
|---|---|---|---|
| 5,159,592 A | 10/1992 | Perkins | 370/85 |
| 5,655,219 A | 8/1997 | Jusa et al. | 370/338 |
| 5,657,317 A | 8/1997 | MahaBy et al. | 370/338 |
| 5,752,246 A | 5/1998 | Rogers et al. | 707/10 |
| 5,774,660 A | 6/1998 | Brendel et al. | |
| 5,918,016 A | * 6/1999 | Brewer et al. | 709/220 |
| 6,047,327 A | * 4/2000 | Tso et al. | 709/232 |
| 6,535,493 B1 | * 3/2003 | Lee et al. | 370/329 |

* cited by examiner

Primary Examiner—Krisna Lim
(74) Attorney, Agent, or Firm—Woodcock Washburn LLP

(57) ABSTRACT

A system for multi-crew management comprises an enterprise computing system, a mobile field unit, and wireless communication network which supports terminal control protocol/internet protocol (TCP/IP). The enterprise computing network comprises application programs through which work orders may be assigned and managed, various server machines containing data related to the work orders, a local area network (LAN) connecting the server machines, and a gateway to the TCP/IP wireless network. A mobile field unit comprises a computing device and modem for communicating over the wireless network to the enterprise computing system. A mobile field unit and each machine in the enterprise computing system has a unique IP address assigned to it. Accordingly, commands and data can be communicated freely between all machines.

27 Claims, 18 Drawing Sheets

Crew Assignment Detail Form

CURRENT STATUS: ENROUTE

| | | | |
|---|---|---|---|
| Assignment # | 7296 | Primary Report Name | BARTLETT MORTGAGE, INC. |
| Outage# | 75320 | Primary Report Address | 00155 N. MAIN ST 108 |
| Device Category | SERVICE TRANSFORMER | Primary Report Phone | (901) 9999999 |
| Device ID | 1071002 | Primary Report Time | 11/23/1998 17:00:38 |
| Device Name | | Symptoms | LIGHTS: OUT<br>EXTENTS: OUT<br>POLE: BROKEN |
| Address | 155 N. Main 107-1002-25 | Customer Comment | Client drove through main lobby, then backed up into pole |

[ Accepted ] [ Rejected ] [ Enroute ] [ Arrived ] [ Complete ] [ Cause Located ] [ CANCEL ] [ ABB ]

(c) 1998 ABB Power T&D

Update Cause / Equip Form

Cause Category  [ANIMAL/BIRD ▼]  ANIMAL/BIRD

Equip. Category  [DIST LINE - OH ▼]  DIST LINE – OH

Est. Restore time  [12/09/1998 09:54]  12/09/1998  09:54

Est. Arrive time  [12/09/1998 09:54]  12/09/1998  09:54

[Update]

[CANCEL]

(c) 1998 ABB Power T&D

MOBILE CREW MANAGEMENT SYSTEM FOR DISTRIBUTING WORK ORDER ASSIGNMENTS TO MOBILE FIELD CREW UNITS

CROSS-REFERENCE TO RELATED APPLICATIONS

This patent is a national phase filing of PCT Patent Application PCT/US99/00497 filed Jan. 8, 1999.

FIELD OF THE INVENTION

This invention relates generally to management information systems and more particularly to automated systems and methods for work order assignment and field communication.

BACKGROUND OF THE INVENTION

Businesses such as utility companies which deploy numerous employees over a wide geographic area to service a dispersed infrastructure or client base are faced with the particularly cumbersome task of communicating work assignments and related data to personnel that are dispersed in the field. For example, a utility company is faced with the daunting task of maintaining an infrastructure that spans a potentially very large geographic area. When outages occur in a utility grid, field personnel must be dispatched to address the problem. Typically, field personnel are already in the field when new service tasks or work orders are generated. Thus, utility companies are faced with the very complex task of receiving work orders, identifying field personnel that are best suited for the job as dictated by training, experience, and proximity to the work area, and communicating to field personnel that a particular work order has been assigned to them. In response, field personnel must communicate to the dispatching operator an acceptance or rejection of the work order. Furthermore, if a work order is accepted, it may be necessary to gather information and data regarding the work order. Such data may include for example the type of equipment that is to be serviced, the maintenance history of the particular equipment item, and information regarding other equipment in close proximity. Upon completion of the work order, field personnel are responsible for updating the central office with information on the status of the work order as well as any changes that may have been made to the infrastructure as a result of the work order. Of course other types of organizations such as delivery companies, facilities maintenance companies, and any other types of organization which must assign work and communicate data regarding those assignments to personnel already deployed in the service area are faced with similar problems.

Generally, field personnel and centralized dispatching operations communicate by two-way voice systems such as wireless phone or radio. Such systems allow for communication of voice and in some cases, with the advent of fax machines, data. But by either voice of fax, the amount and type of information that can be easily communicated to field personnel is limited. Indeed, while all of the relevant data necessary for completing a task may be located in a central office, very little of it can be communicated to field personnel. For this reason, field personnel carry with them information resources such as maps and data sheets. Unfortunately, these often quickly become outdated which can lead to a dangerous work environment for field personnel.

Of course, systems have previously been developed to facilitate work assignment and data communication. These systems, however, have used proprietary technology. Further, maintenance of prior systems typically has required manually updating individual nodes of the system through non-network means.

Although these existing systems are useful, there is a need for more advanced two way data communication between field personnel and a central office. In particular, there is a need for a system whereby tasks can be assigned and automatically communicated to field personnel with little or no dispatcher intervention. Field personnel should be able to access on-line the most up-to-date data related to the work order. Additionally, there is a need for a system whereby field personnel are able to update system records to reflect physical changes resulting from their work as well as update system records to reflect changed work order status. Furthermore, such a system should use non-proprietary technologies and be easily maintained.

SUMMARY OF THE INVENTION

Briefly, the present invention provides a system for assigning work orders, communicating work orders to deployed field personnel, and communicating at the request of field personnel, up-to-date data related to an assigned work order. The system comprises an enterprise computing system, a mobile field unit, and wireless communication network which supports terminal control protocol/internet protocol (TCP/IP). The enterprise computing network comprises application programs through which work orders may be assigned and managed, various server machines containing data related to the work orders, a local area network (LAN) connecting the server machines, and a gateway to the TCP/IP wireless network. A mobile field unit comprises a computing device and modem for communicating over the wireless network to the enterprise computing system. A mobile field unit and each machine in the enterprise computing system has a unique IP address assigned to it. Accordingly, commands and data can be communicated freely between all machines.

According to another aspect of the invention there is provided a method for managing work order assignments. There is also disclosed a method for distributing map data. According to still another aspect of the invention there is provided a method for monitoring communications in the system.

BRIEF DESCRIPTION OF THE DRAWINGS

Other features of the invention are further apparent from the following detailed description of presently preferred exemplary embodiments of the invention taken in conjunction with the accompanying drawings, of which:

FIG. 11 is an illustration of an exemplary screen for displaying detailed assignment data;

FIG. 13 is an illustration of an exemplary screen for entering data related to the cause of an outage;

DETAILED DESCRIPTION OF PREFERRED EMBODIMENT

The present invention provides a multi-crew management system. More particularly the management system is an automated system for the distribution of work orders and related materials to field personnel dispersed over a wide geographic area. A work order, which may be any type of description of a particular task, are assigned using a centralized enterprise computing system and are communicated over a wireless network to field personnel having mobile computing units. Field personnel can use a mobile field unit to access the enterprise computing system and gather information about the work order as well as to update the enterprise computing system with details regarding the status of the work order. Thus, a system in accordance with the present invention provides two-way communication and work order automation with minimum dispatcher/operator interference.

Figure 1:
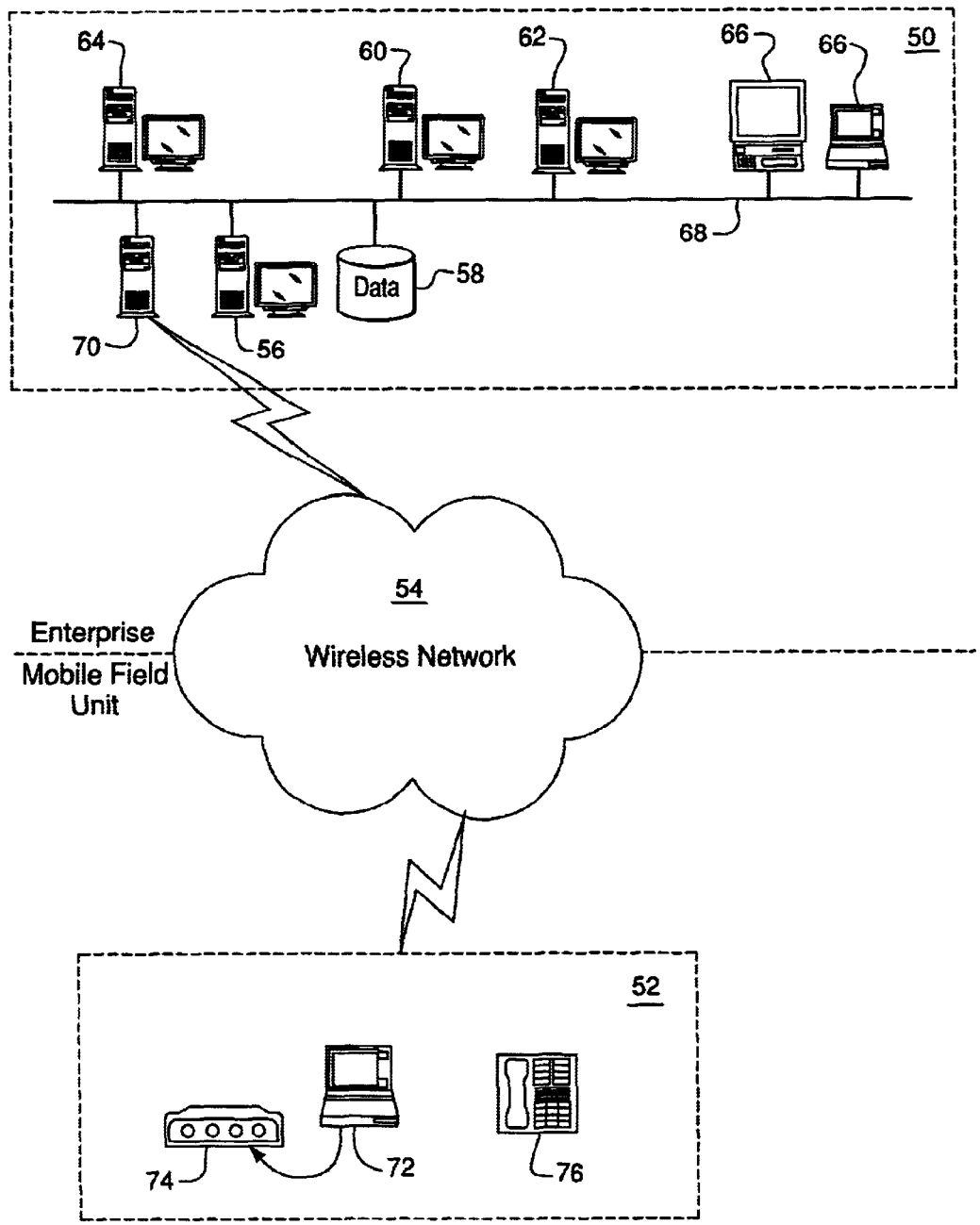
FIG. 1 is a schematic diagram of a system in accordance with the present invention.

FIG. 1 graphically depicts a system in accordance with the invention. As shown, the inventive system comprises enterprise computing system 50, mobile field unit 52, and wireless communication network 54 operably connecting the two.

Enterprise computing system 50 may comprise database servers 56 for fielding requests to data stored in database 58, hypertext transfer protocol (HTTP) servers 60 for fielding requests for web page data, monitoring server 62 for accepting and providing data regarding the status of work orders, and file servers 64. While each of servers 56, 60, 62, and 64 is represented by a separate machine in FIG. 1, in some embodiments of the enterprise system a single machine may be configured to perform all of these operations. An enterprise computing system may also comprise workstations 66 from which various application programs may be accessed. Servers 56, 60, 62, and 64 and workstations 66 are interconnected through an Ethernet local area network (LAN) 68.

LAN 68 supports TCP/IP and each of machines 56, 60, 62, 64 and 66 is uniquely identified with an IP address. Gateway 70 provides a communication connection between LAN 68 and wireless TCP/IP network 54.

In a typical application of the inventive system, enterprise computing system 50 is located at a central office or operations center. As is explained in greater detail below with reference to FIG. 2, work orders are processed and input to the enterprise computing system using any one of several application programs. Data which field personnel may require to complete their assigned tasks is located on servers 56, 60, 62, and 64 and may be accessed by field personnel using mobile field unit 52.

Mobile field unit 52 comprises computing device 72 which may be a portable computer, a personal digital assistant (PDA), or similar device. Typically computing device 72 comprises random access memory (RAM), web browser software for internet and intranet communications, and an interactive display mechanism. Computing device 72 may also include: storage capability (flash or electromechanical), a serial interface, an audio playback device, and software to support a TCP/IP protocol stack and point-to-point protocol (PPP).

Mobile field unit 72 may also comprise wireless radio modem 74. Wireless radio modem 74 provides a means for communicating over wireless network 54 between computing device 72 and enterprise computing system 50. Wireless radio modem 74 supports PPP protocol and TCP/IP protocol over wireless radio network 54. Wireless radio modem 74 may be internal or external to computing device 72.

Mobile field unit 52 optionally may comprise a wireless two-way voice communication device 76. Device 76 may be integrated with computing device 72 or may be a separate radio device, cellular phone, or digital cellular phone.

Each field crew is assigned a mobile field unit 52. Thus, although only one is shown in FIG. 1, numerous mobile field units 52 may be deployed and operating at once. As noted, each mobile field unit 52 has an IP address assigned to it. Further, enterprise computing system 50 comprises a database of entries indicating for each field unit, the field crew which has the unit. Thus, when a work order is assigned to a particular field crew, the inventive system automatically routes the appropriate commands and data as described below to the appropriate mobile field unit 52. Field crews are free to access enterprise computing system 50 to gather data that may be helpful in completing the assigned work order.

Wireless radio network 54 provides TCP/IP communication between enterprise computing system 50 and mobile computing device 52. As previously noted, each mobile field unit 52 is given a unique IP address. Similarly, machines on enterprise computing network 50 are given a unique IP. Because wireless radio network 54 supports TCP/IP, routing of data and commands between mobile field units 52 and enterprise computing system 50 can be accomplished by existing network techniques. Further, mobile field units 52 can be arranged into various network configurations such as subnets and intranets and in theory, if the appropriate gateways are arranged, can be accessed via the Internet.

IP addressing allows for commands to be routed to, and data accessed from any machine in the network. Thus, data and/or a command may be transmitted via gateway 70 to wireless radio network 54 and delivered at any particular mobile field unit 52. Similarly, data and/or a command may be transmitted from mobile computing device 52 via modem 74 to wireless network 54 which delivers the data and/or command to a particular machine designated by a unique IP address on enterprise computing system 50.

Preferably, wireless network 50 employs native TCP/IP. However, any network type may be employed provided it can be adapted to support TCP/IP. Thus, wireless network 54 may be any of the following network types: a CDPD public network (packet-switched); a radio packet-switched network (adapted for TCP/IP); a tariff/non-tariff-based network; or a Personal Communication Systems network(circuit-switched). A system in accordance with the invention can be implemented at any location that one of these network types exists.

Cellular Digital Packet Data (CDPD) is an open standard public network. In one embodiment of the present invention, modem 74 is a CDPD modem which is assigned a unique 32 bit IP address. The IP address becomes the unique identifier associated with mobile field unit 52.

Typically, where CDPD networking technology is employed, network connection between mobile field unit 52 and enterprise computing system 50 can be maintained continuously. Thus, with a CDPD communications network, the connection between the enterprise system 50 and mobile field units 52 does not require call setup or dial-in/dial-out specifications. The transfer of data between enterprise system 50 and mobile field unit 52 is immediate or within seconds via a virtual TCP/IP circuit which maintains continuous two-way traffic across the CDPD packet-switched data system. Any data packet originating from either the enterprise system 50 or mobile field unit 52 is delivered almost immediately.

In an alternative embodiment, wireless network 54 may be a Personal Communications System (PCS) network. With a cellular network the communications can be either digital or analog across a circuit-switched data system. In a circuit-switched data system the connection between enterprise computing system 50 and mobile field unit 52 must be established via an initiation call. Thus, call setup and dial-in dial-out specifications are required to deliver or receive data. When a call is complete, the TCP/IP circuit is terminated and communication between enterprise system 50 and the mobile field unit 52 is unavailable. In an embodiment of the present inventive system where PCS communication is employed, analog modems may be deployed in both enterprise computing system 50 and mobile field units 52. The analog modems convert modulated digital data to be translated over the voice band of a cellular phone.

In still another embodiment of the present invention, wireless network 54 may comprise a radio (wireless) packet-switched network which does not support TCP/IP. Like TCP/IP-based CDPD communications, radio packet-switched networks can transmit and receive packet data anytime without call setup. These networks include both public proprietary data networks (e.g., ARDIS and RAM) and private radio networks (e.g., DATA TAC). However, because the inventive system relies upon TCP/IP, in order to employ such networks it is necessary to use third party equipment such as that provided by PADCOM Incorporated to allow such a network to support TCP/IP.

Figure 2:
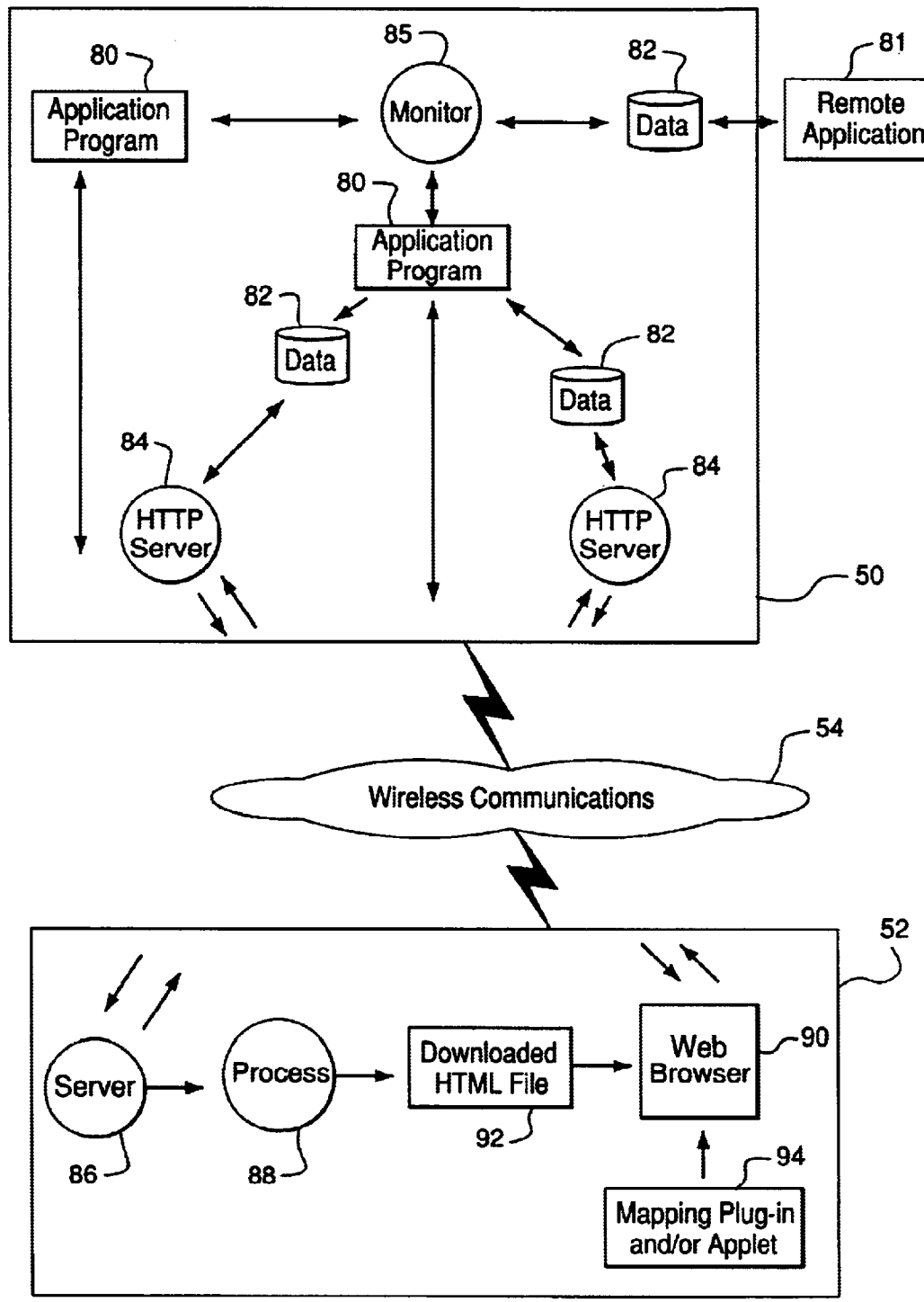
FIG. 2 is a diagram of software components of a system in accordance with the present invention.

Enterprise computing system 50 and mobile field unit 52 comprise various software components. FIG. 2 is a diagram of software components comprised in a system in accordance with the present invention. As shown, in enterprise computing system 50, numerous application program components or clients 80 may exist. Preferably these are written using the JAVA programming language so as to be operable on platforms running various operating systems. Each application 80 may serve a particular purpose with respect to managing work orders and monitoring the progress of those work orders. It should be noted that there may be multiple instances of the same application 80 running at any one time. Furthermore, remote applications 81 from outside system 50 may also occasionally access system resources.

Enterprise computing system 50 also comprises database server software 82 which may be, for example, an Oracle database server. Indeed, there may be multiple databases 82 in one system 50. Database server software 82 manages work order data as well as other business related data. For example, in the case of a utility, databases 82 might comprise detailed equipment data and map data.

Enterprise computing system further comprises HTTP servers 84 which may be, for example, a Netscape or Apache HTTP server. HTTP servers 84 are operable to field requests from all machines but particularly from web browsers located in mobile field unit 52. HTTP servers 84 are operable to launch or invoke stored procedures or common gateway interface programs (CGI) to implement actions initiated by field crew members at mobile field unit 52. The CGI is a mechanism which allows data to be transferred from a browser to a program residing on the server via the HTTP server such that the program processes the data (usually parameters) and can deliver results back to the browser via the HTTP server. It should be noted that by invoking stored procedures it is meant that HTTP server 84 which has been delivered the name of a stored procedure within a database, can cause the stored procedure to execute via an intermediate program passing it parameters. The stored procedure can generate data which it can deliver to a program such as a web browser via HTTP server 84. The stored procedure typically accesses database tables.

Monitor server software 85 accepts updates from applications 80 indicating that a work order has been assigned. Monitor server software 85 also accepts updates as to whether the work order was received at field unit 52 and whether it was accepted by the field crew. Monitor server 85 also provides a report generation feature.

Mobile field unit 52 comprises mobile server application 86. Mobil server application 86 services requests from enterprise computing system 50 to mobile field unit 52. In a preferred embodiment, mobile server 86 is written in the JAVA programming language which allows for mobile server 86 to run on numerous hardware platforms running various operating systems such as Windows, Mac OS, or Unix. Mobile server 86 is multi-threaded meaning it listens for requests and upon receipt of an input, spawns process 88 to react to the input. In this way, mobile server 86 can continue to listen for additional requests.

Mobile field unit 52 also comprises web browser 90 which may be loaded with files 92 that are downloaded from enterprise computing system 50. Web browser enhancer 94 is loaded by web browser 90 to display maps and related data. Web browser enhancer 94 may be a plug-in that is initially stored on mobile field unit 52. Alternatively, web browser enhancer 94 may be an Applet that is downloaded from enterprise computing system 50.

Figure 3:
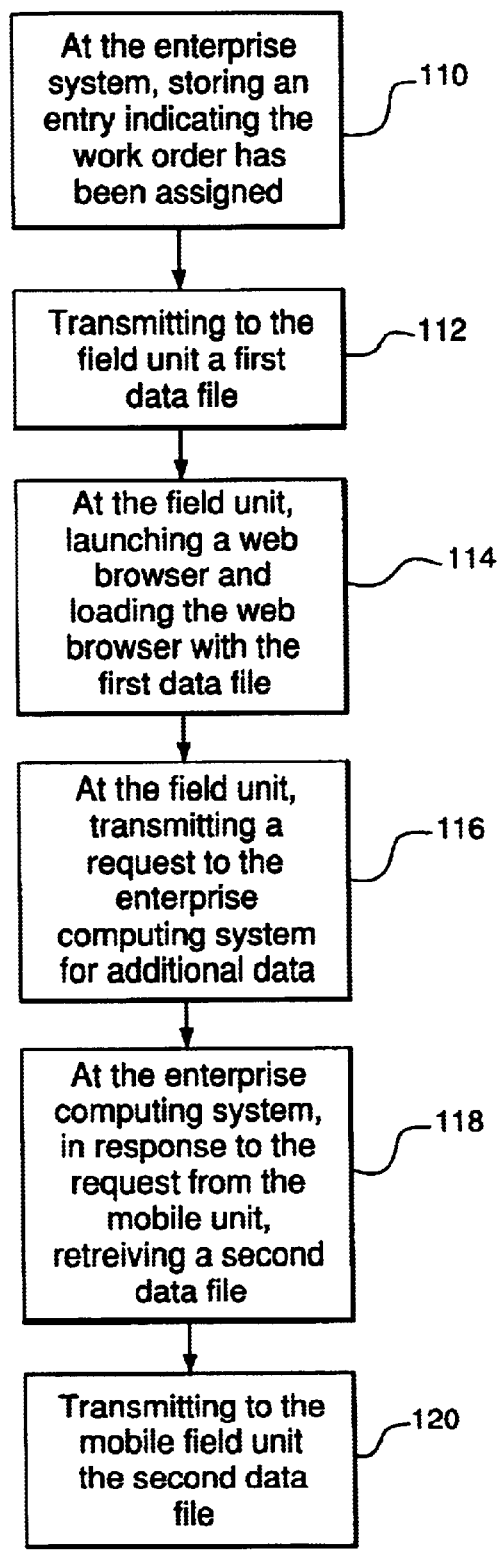
FIG. 3 is a flow diagram of process in accordance with the present invention for assigning a work order to a field crew.

Typically operations in a system in accordance with the present invention are initiated at one of application programs 80. For example, a work order may be assigned to a particular field crew using application program 80. FIG. 3 is a high-level flow chart of the process of making a work order assignment to a field crew having a mobile field unit 52. Generally, an operator at enterprise computing system 50 employs application program 80 to assign a work order or task to a particular field crew. As shown, at step 110 an entry indicating that a work order or task has been assigned to the field crew is entered in database 82. At step 112 data file 92 related to the work order along with a command to launch a web browser are transmitted to field unit 52. At step 114 mobile field unit 52 launches web browser 90 and loads web browser 90 with data file 92 which causes a web page to be displayed. In response to input from field personnel such as pointing and clicking on links in the displayed web page, at step 116 mobile field unit 52 transmits to enterprise computing system 50 a request for additional data regarding the work order. At step 118 enterprise computing system 50 retrieves the requested data, usually in the form of a data file. At step 120 the retrieved data is transmitted to mobile field unit 52.

Figure 4:
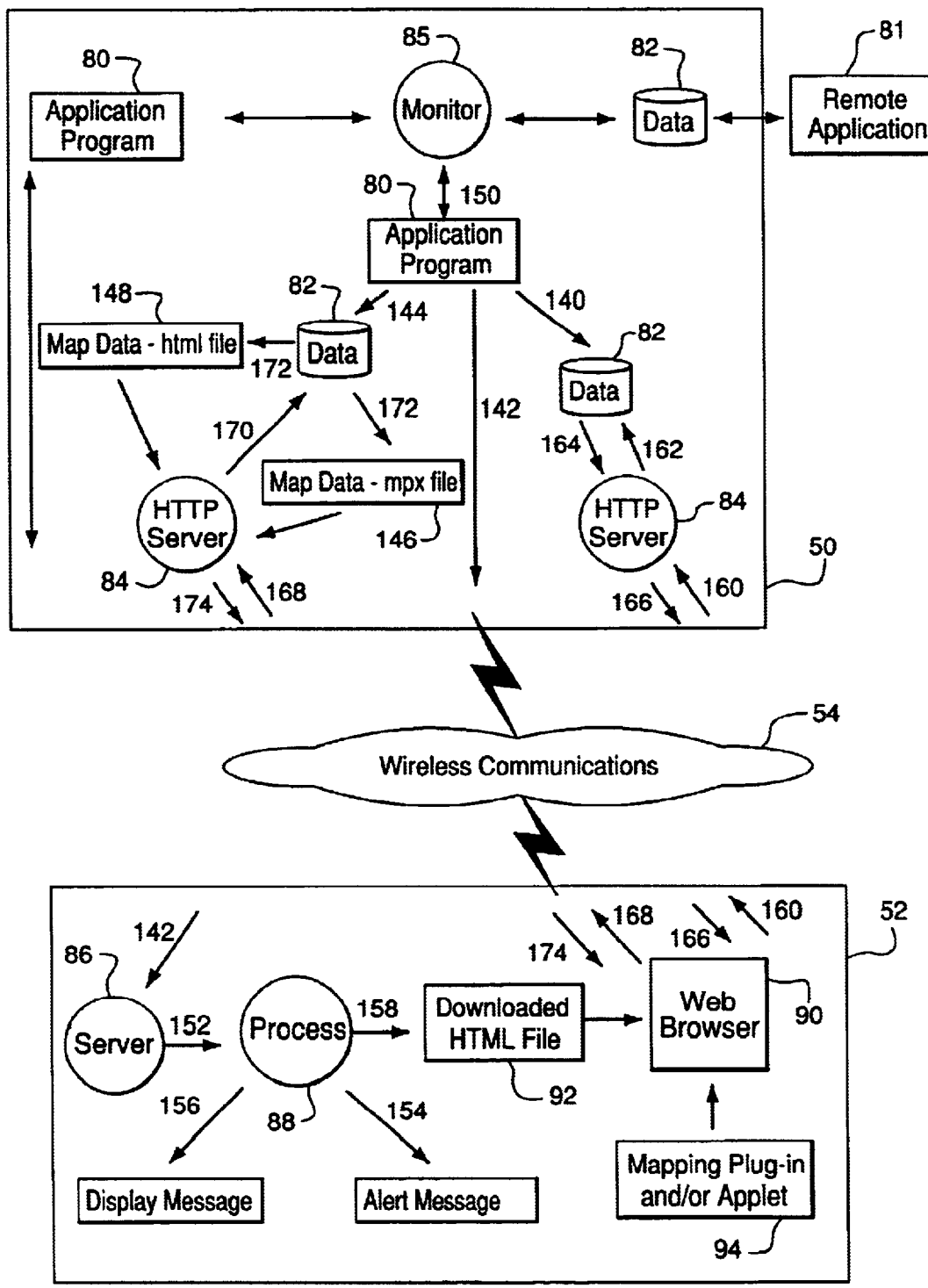
FIG. 4 is diagram of software components and data flows in a system in accordance with the present invention.

FIG. 4 depicts various command and data flows that may be implemented in a system in accordance with the present invention when a work order is assigned to a field crew. Typically, work orders are assigned by personnel at enterprise computing system 50 using application program 80. In response, application program 80 requests, as represented by arrow 140, that database 82 be updated to reflect that the work order has been created. Generally, when a work order is created it is assigned a unique identifier in database 82. Thereafter, application program 80 establishes a TCP/IP connection with mobile server 86 and transmits a command to mobile server 86 (arrow 142). Simultaneously, a command may be issued (arrow 144) by application program 80 to database 82 directing the generation of map related data corresponding to the work order.

In one embodiment, the map related data comprises two files of mapping data. A first file 146 is in ASCII format and comprises map data in vector format. Typically the file is given a name ending in .mpx. The file extension .mpx identifies the file as a MIME type. As explained below, upon receipt of a file with the .mpx extension, web browser 90 is programmed to load plug-in 94 and display the map data contained therein in a map area of web browser 90. .Mpx file 146 comprises unique identifiers for select objects that are displayed on the map. For example, a unique device identifier for a transformer may be included in .mpx file 146. Using these unique identifiers, when a crew member clicks on an object in the map, detailed data regarding the particular device can be retrieved from database 82.

An exemplary portion of ".mpx" file 146 is listed below:
5 18 1075553 1082844 0 U36864 36864
5 18 1071543 1082969 0 U27824 27824
5 18 1072568 1083014 0 U27825 27825
5 18 1076096 1084066 0 U27826 27826
5 18 1082774 1084547 0 U27829 27829
5 18 1077940 1085438 1 U27828 27828

According to a preferred embodiment of the invention, each line in ".mpx" file 146 represents a map object to be displayed. Each line is formatted into seven columns. The first column designates the map object type. For example, type 5 represents an electrical network object. The second column identifies the type of electrical network object. For example, an electrical object may be a fuse transformers. The third and fourth columns represent the state plane coordinates of the object. The fifth column represents the state of the device, for example, open or closed. The sixth column identifies the unique device identifier. This unique identifier when combined with the uniform resource locator parameter which as explained below is stored in file 148, allows mapping plug-in 94 to request more detailed data regarding a selected device as well as change the state of the device. The seventh column is an identifier used to speed up the device lookup process.

A second file 148 is generated and formatted in HTML. HTML file 148 contains parameters which are used to configure plug-in 94. A first parameter sets the uniform resource locator (URL) for HTTP server 84 and the specifies the common gateway interface (CGI), or alternatively the stored procedure, which should be invoked when a user clicks on a device or map object that is displayed on the map. A second parameter enables or disables the ability for a crew to obtain information about an object. Other parameters control the display of the land base map data as well as control other settings.

An exemplary html file 148 is listed below:
<HTML><HEAD>
<TITLE>MAP Plugin</TITLE>
</HEAD>
<BODY>
<H3>CADOPS Plugin </H3>
<EMBED SRC="5979_map.mpx" device_url="http://abb.vnet.net/ast/owa/getobj dl" enable_mobile_cadops=1 fixed=1 width=750 height=450 minx=1068940 miny=1076438 maxx=1086940 maxy=1094438 curvetype="map"></EMBED>
<H5>outage: 5979</H5>
<H3>CADOPS-WEBMAP </H3>
<H45>ABB Distribution Information Systems, all rights reserved co1998</H45>
</BODY>
</HTML>

In the above example, the object URL is specified by the "device_url" parameter. Note that the EMBED tag specifies the ".mpx" file 146 as 5979_map.mpx. This file is delivered to web browser 90 and ultimately to plug-in 94 for display.

The unique identifier for the work order to which the map data relates is embedded in the names of both files 146 and 148. This facilitates the later retrieval of these files. Application program 80 also requests that monitoring server 85 update records in database 82 to indicate that a particular work order has been transmitted to mobile unit 52 (arrow 150).

At mobile field unit 52, mobile server 86 spawns (arrow 152) process 88 to respond to the command from application program 80. In response to a command that a new work order has been assigned to the field crew, process 88 may cause an alert sound to be broadcasted (arrow 154). Thereafter or simultaneously, an alert message may be automatically displayed on the display of the mobile field unit 52 (arrow 156) to further alert the field crew. Process 88 launches web browser 90 (arrow 158) and loads web browser 90 with data, usually in the form of an HTML file 92 that was downloaded from application program 80 with the initial command.

Typically, downloaded html file 92 which is displayed in web browser 90 has web links to data stored in enterprise computing system 50. Thus, when field crew personnel click on a link in web browser 90, a request, preferably in the form of a HTTP post or get command (arrow 160) is made of HTTP server 84 in enterprise computing system 50. In response, HTTP server 84 queries, preferably by way of a stored procedure (arrow 162) database 82 for the requested data. Database 82 returns (arrow 164) the requested data to HTTP server 84, and HTTP server transmits 84 (arrow 166) the requested data to web browser 90. In a preferred embodiment, database 82 returns the data in HTML format.

Figure 5:
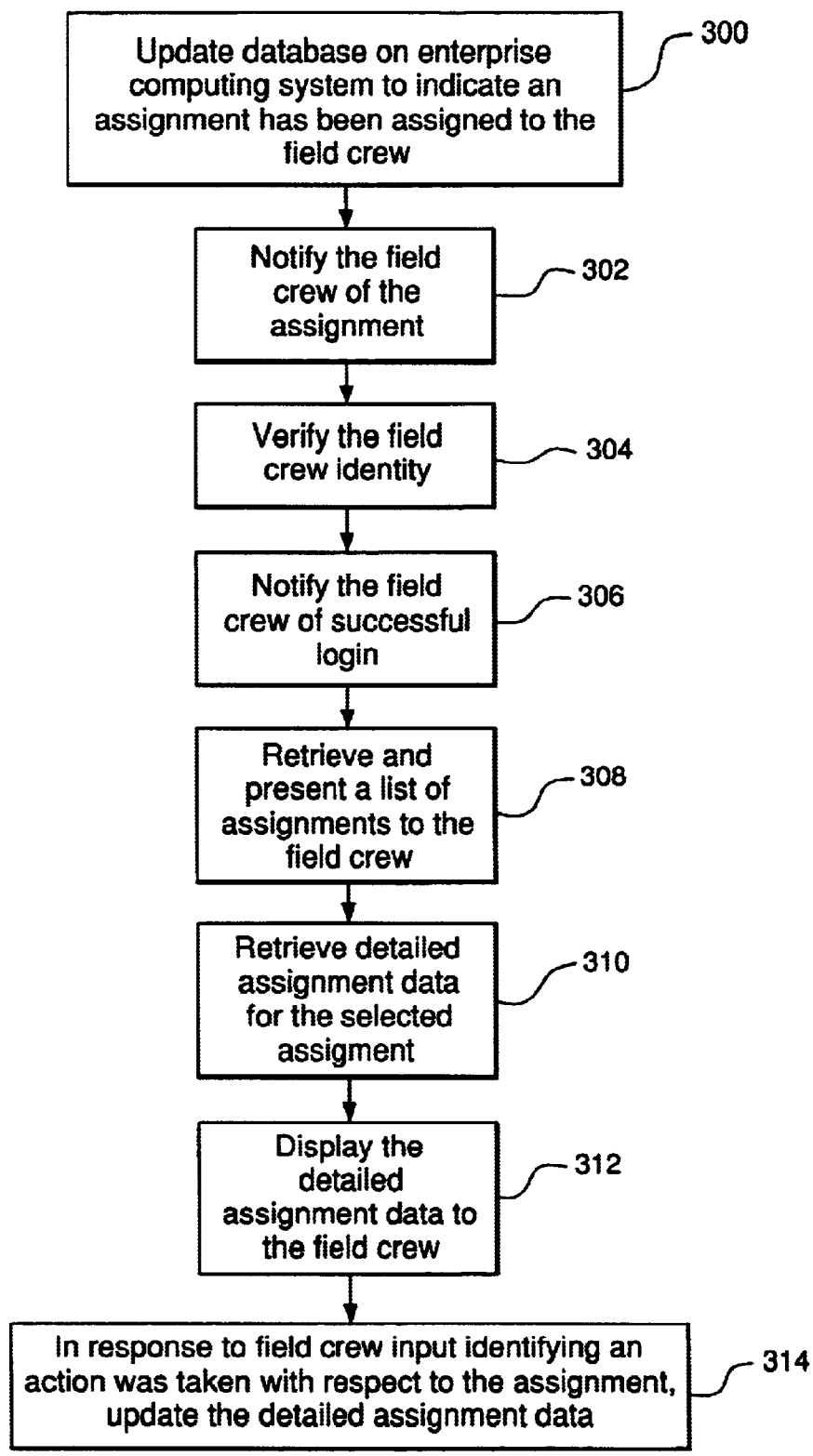
FIG. 5 is a flow diagram of a process in accordance with the present invention for distributing work order assignment data to a field crew having a mobile field unit.

FIG. 5 provides a flow chart depiction of a scenario for using the system of FIGS. 1 through 5 to distribute work order assignment data to a field crew having a mobile field unit. As shown, at step 300 database 82 is updated using application program 80 to indicate a work order has been assigned to a particular field crew. At step 302 the field crew is notified of the assignment via mobile field unit 52. In response to login data input by the field crew, at step 304 the identity of the field crew is verified against database 82 of enterprise computing system 50. At step 306 a notification is made to the field crew via field unit 52 if the login was successful. At step 308 a list of assignments is retrieved and presented to the field crew. At step 310 in response to input by the field crew selecting an assignment from the list of assignments, detailed assignment data for the selected assignment is retrieved from database 82. At step 312 the detailed assignment data is displayed to the field crew via mobile field unit 52. At step 314 in response to field crew input identifying that an action was taken with regard to the assignment, the detailed assignment data is updated in database 82.

Figure 6:
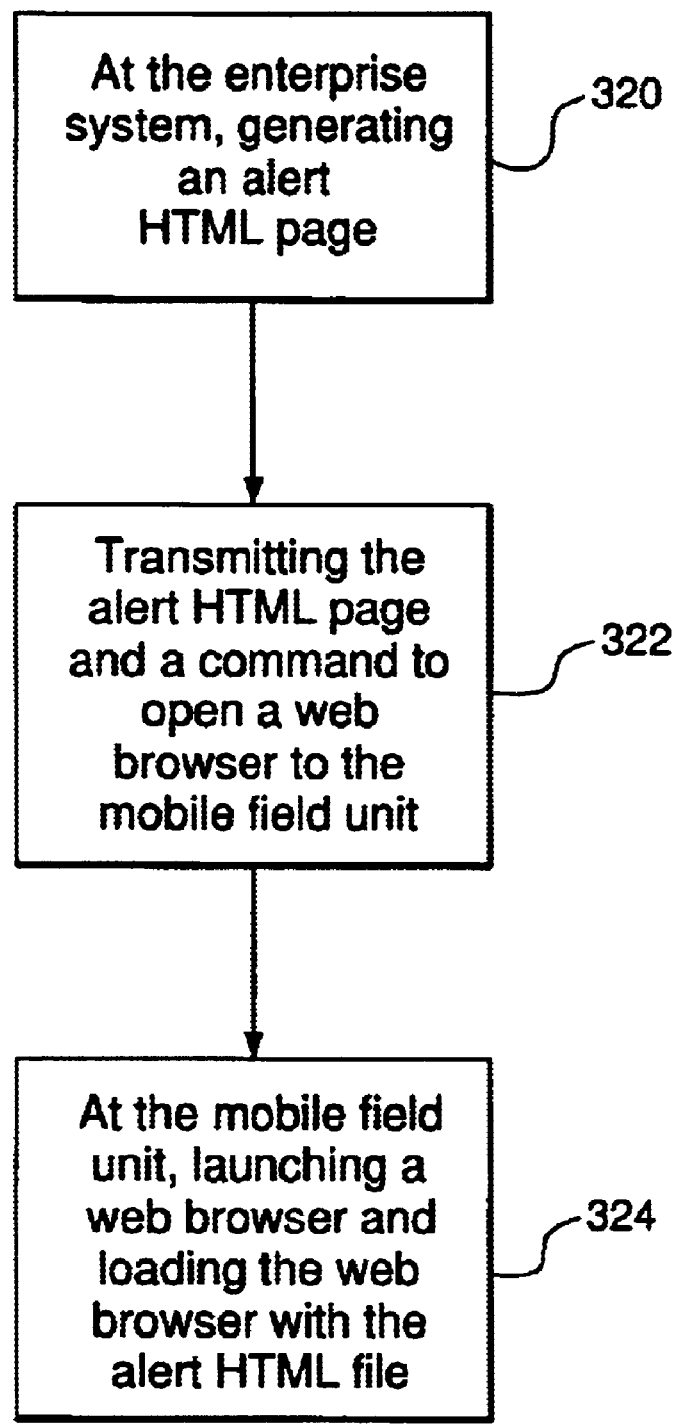
FIG. 6 is a flow diagram of a process in accordance with the present invention for notifying the field crew of an assignment.

FIG. 6 provides a detailed flow chart of step 302 of FIG. 5 for notifying the field crew of the assignment. As shown at step 320 an "alert HTML page" is generated at the enterprise computing system in response to the assignment being assigned to the particular field crew. At step 322 the "alert HTML page" and a command to open a browser is transmitted from enterprise computing system 50 to mobile field unit 52. At step 324 web browser 90 is launched in response to the command and the "alert HTML page" is loaded into web browser 90.

Figure 7:
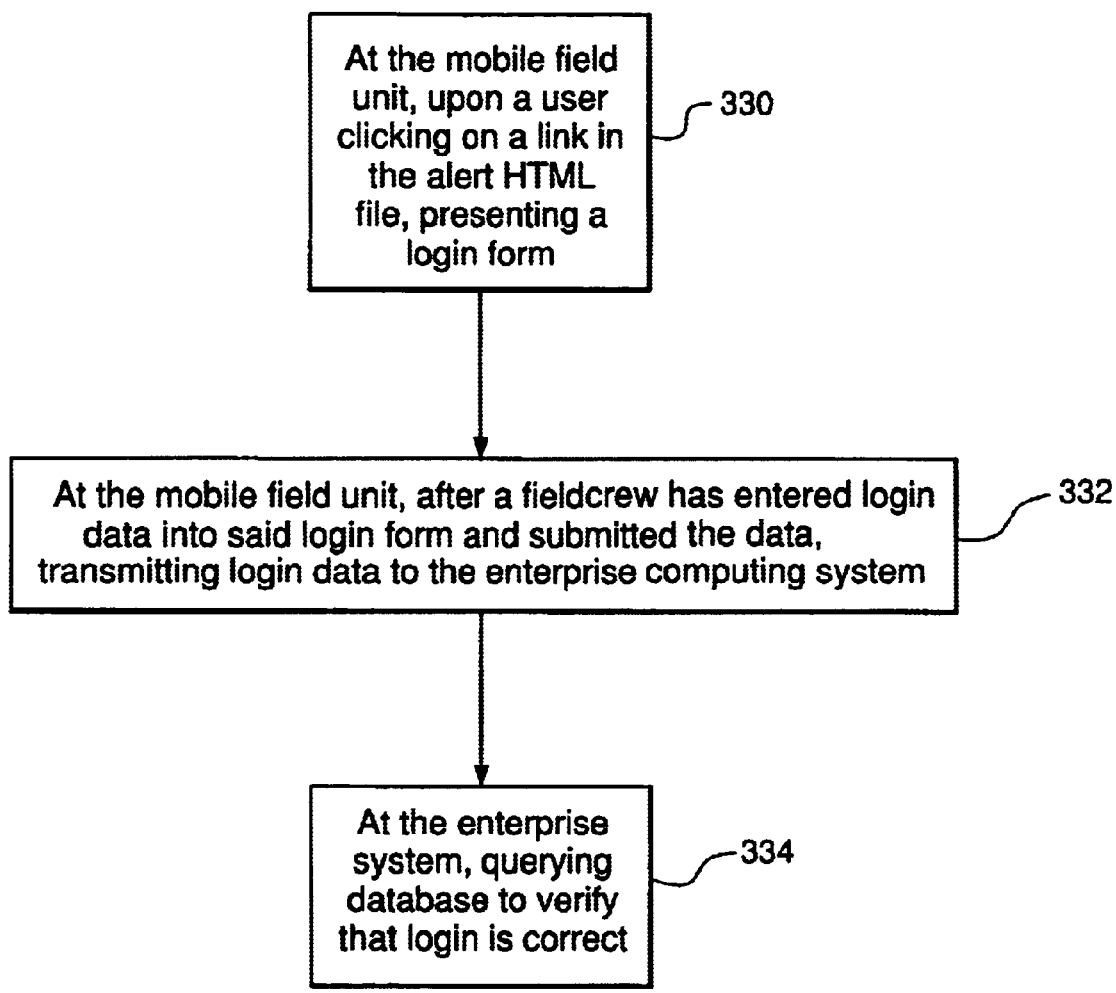
FIG. 7 is a flow diagram of a process in accordance with the present invention for verifying the field crew identity.

FIG. 7 provides a detailed flow chart of step 304 of FIG. 5 for verifying the field crew identity. At step 330 in response to a field crew member clicking on a link in the "alert HTML file," a login form is displayed. It should be noted that this link and the others that are described herein may comprise a URP and point to a specific application, for example a CGI or stored procedure which should be executed in response to clicking upon the link. The link may cause data, including web pages, to be retrieved from or updated in enterprise computing system 50. At step 332 in response to the field crew entering login data into the login form and submitting the login data, the login data is transmitted to enterprise computing system 50. At step 334 database 82 is queried to verify that the login data is correct.

Figure 8:
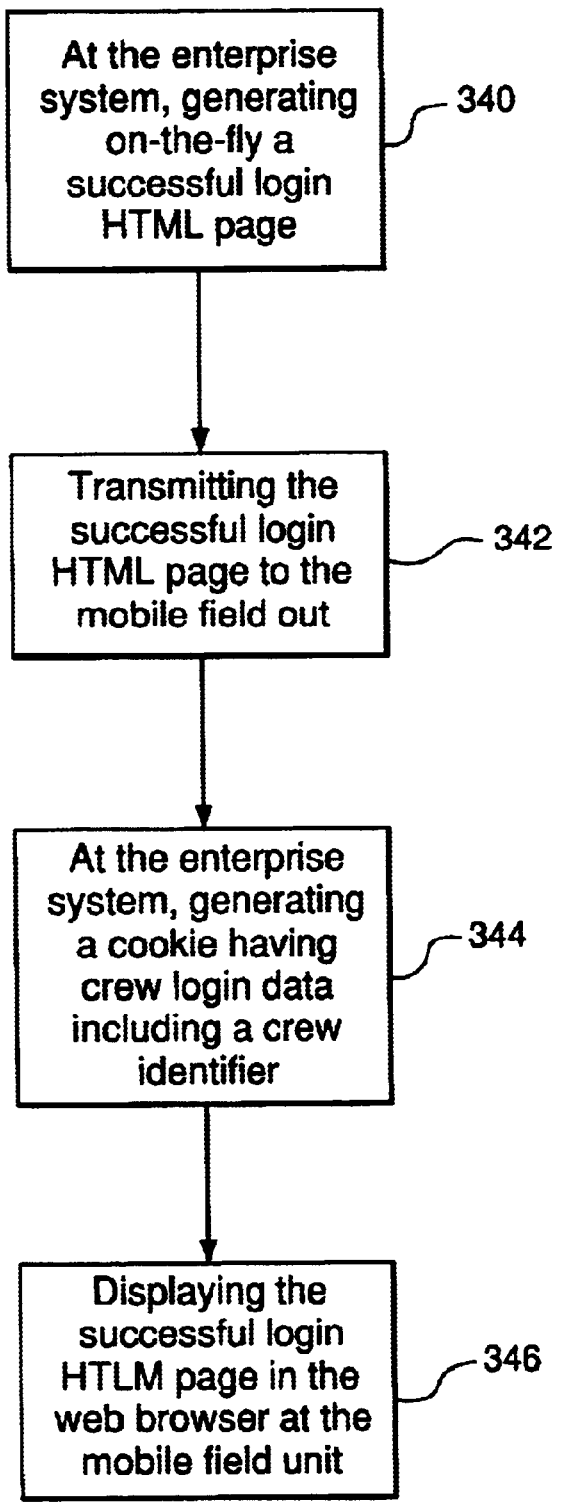
FIG. 8 is a flow diagram of a process in accordance with the present invention for notifying the field crew of a successful login.

FIG. 8 provides a detailed flow chart of step 306 for notifying the field crew of a successful login. At step 340 of FIG. 8, a "success HTML page" indicating there has been a successful login is generated at the enterprise computing system. At step 342 the "success HTML page" is transmitted to the mobile field unit 52. At step 344 at enterprise computing system 50 a cookie is generated. The cookie contains data related to the field crew such as a unique field crew identifier. The cookie remains resident for a selected period of time so that upon subsequent accesses to the enterprise computing system 50 by the same field crew during the selected period of time, the field crew does not need to login again. Any programs, for example stored procedures which may require data such as the field crew identifier can obtain that information from the cookie. The cookie may be generated by a CGI that was initiated by HTTP server 84. At step 346 the "success HTML page" is displayed at mobile field unit 52 using web browser 90. The "success HTML page" has a "continue link" therein for continuing with the assignment distribution process.

Figure 9:
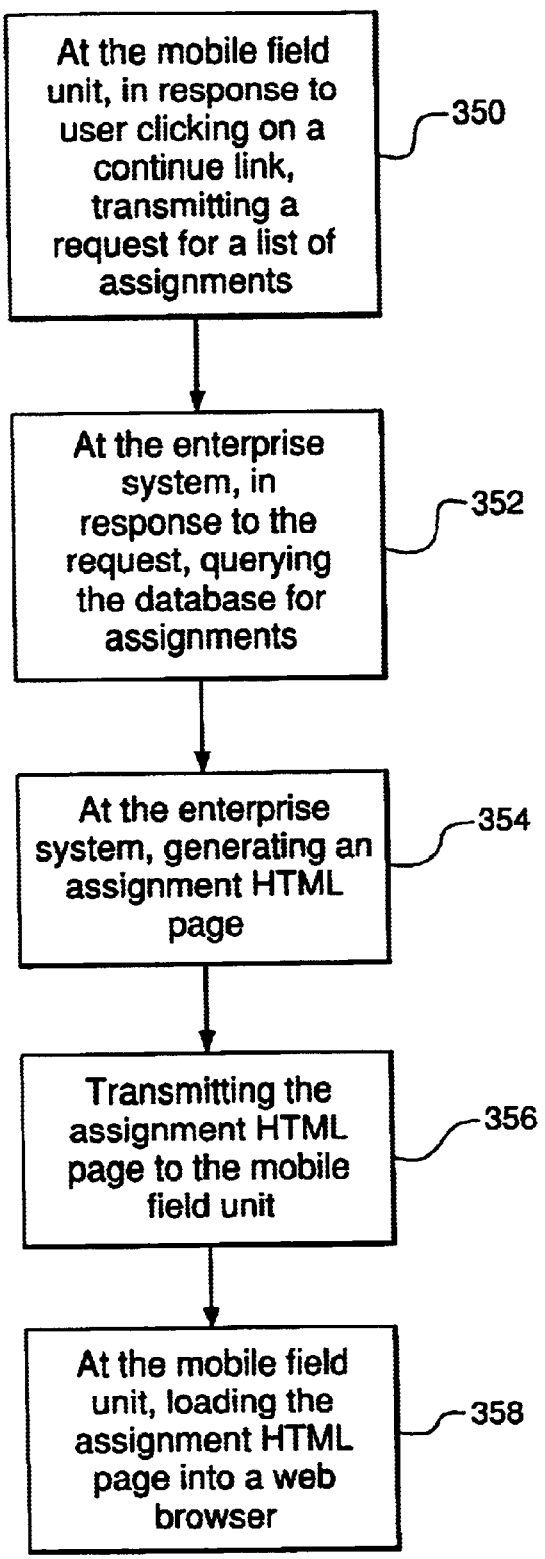
FIG. 9 is a flow diagram of a process in accordance with the present invention for retrieving and presenting a list of assignments to the field crew.
Figure 10:
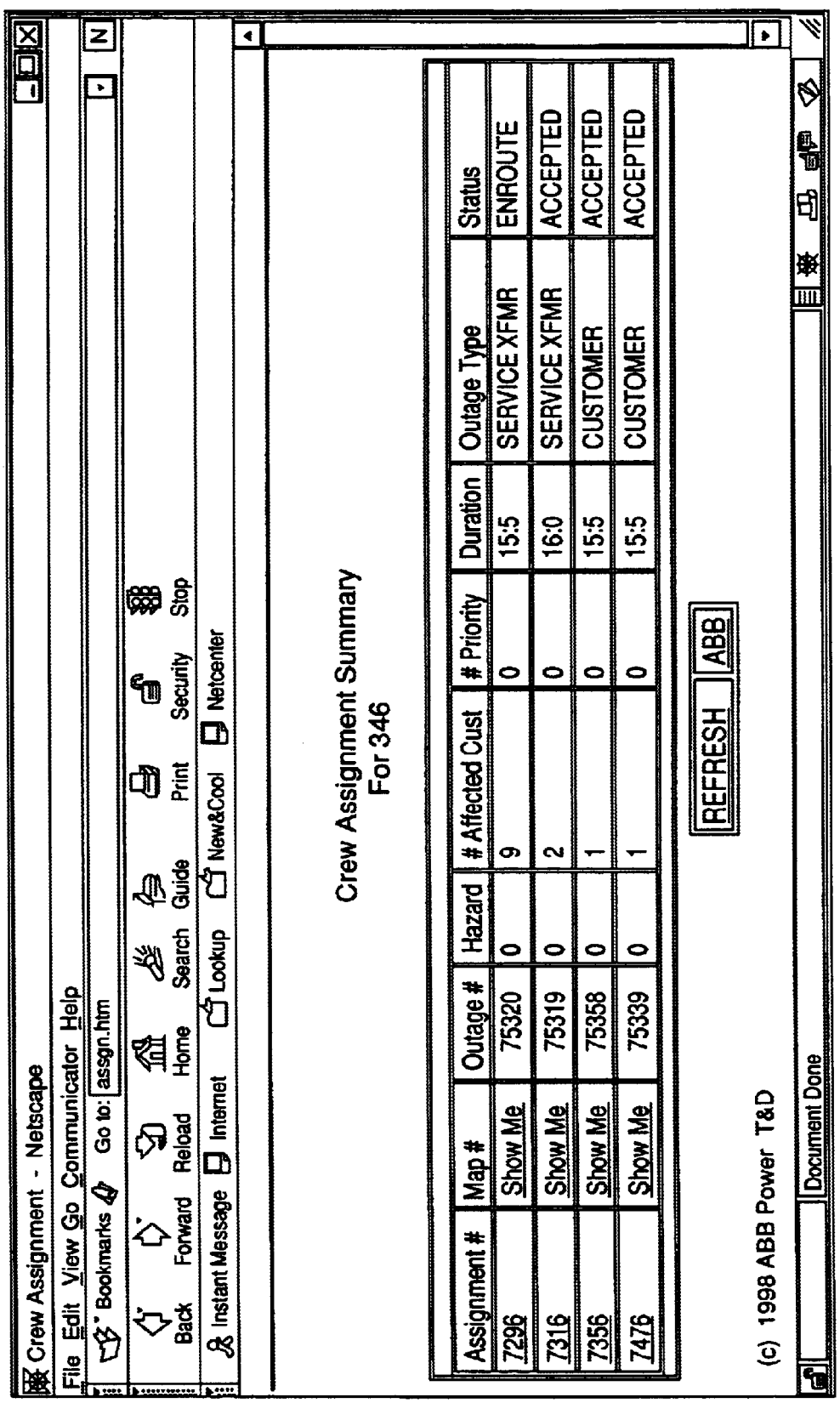
FIG. 10 is an illustration of an exemplary screen showing a list of work order assignments that have been assigned to a field crew.

FIG. 9 provides a detailed flow chart for step 308 of FIG. 5 for retrieving and presenting a list of assignments to the field crew. At step 350, at mobile field unit 52, in response to a field crew member clicking on the "continue link" in the "success HTML page," a request is transmitted for a list of assignments. At step 352 at the enterprise computing system 50, database 82 is queried for assignments that have been assigned to the field crew. The field crew identifier, which may be retrieved from the cookie, is used in performing the query. At step 354 at enterprise computing system 50, an "assignment HTML page" is generated containing data comprising a list of assignments that have been assigned to the particular field crew. The "assignment HTML page" may be generated by a common gateway interface or a stored procedure invoked by an HTTP server. The "assignment HTML page" has "assignment links" to additional data in the database corresponding to each assignment. Each "assignment link" contains a unique identifier for the assignment which may be used in retrieving the additional assignment data from database 82. These "assignment links" may comprise a uniform resource locator (URL) for the server and program on enterprise computing system 50 that should be executed in order to retrieve the desired data. At step 356 the "assignment HTML page" is transmitted to the field crew via mobile field unit 52. At step 358 the "assignment HTML file" is loaded into web browser 90. FIG. 10 provides an exemplary screen of the type that may be displayed upon loading of the "assignment HTML page" into web browser 90.

Figure 12:
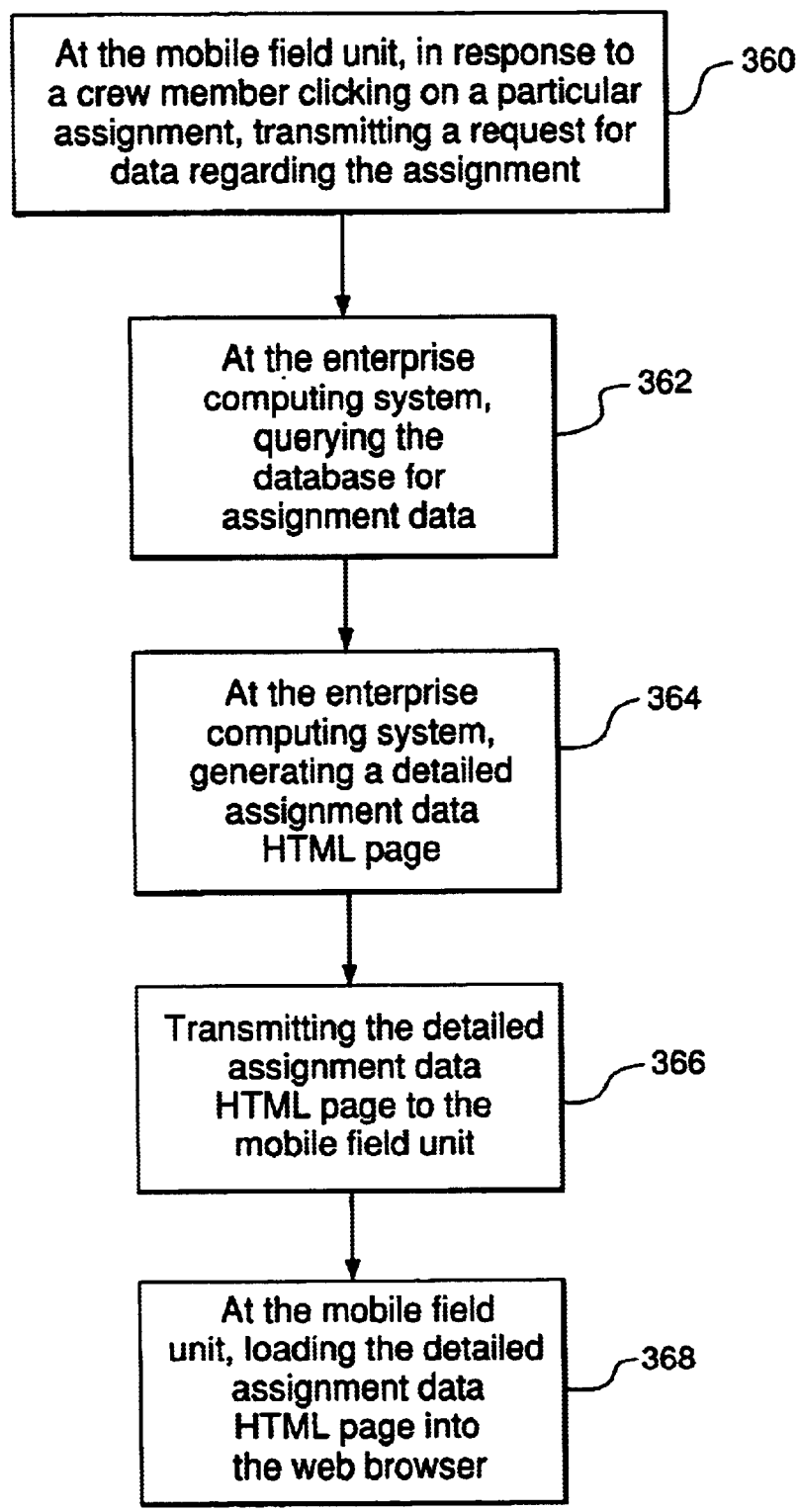
FIG. 12 is a flow diagram of a process in accordance with the present invention for retrieving detailed assignment data for a selected assignment.

FIG. 12 provides a detailed flow chart corresponding to step 310 of FIG. 5 for retrieving detailed assignment data for the selected assignment. As shown, at step 360 at the mobile field unit 52 in response to a crew member clicking on an "assignment link" in the assignment HTML page, a request for data related to the selected assignment is transmitted to enterprise computing system 50. At step 362 at the enterprise computing system 50 the database 82 is queried for assignment data related to the selected assignment. At step 364 at enterprise computing system 50 a "detailed assignment data HTML page" is generated. The "detailed assignment data HTML page" contains detailed data regarding the assignment that was selected previously by the field crew. An example of a displayed screen corresponding to a "detailed assignment data HTML page" is shown in FIG. 11. The "detailed assignment data HTML page" contains a plurality of "HTML status links" each of which when clicked upon causes a different action to be taken relative to the data in database 82 that tracks the status of the particular assignment. "HTML status links." may contain a uniform resource locator and program name that implements the desired action in database 82. For example, one of the plurality of links may be an "accepted link" which when clicked upon causes the status data in the database to indicate the assignment has been accepted. One of the plurality of links might be an "enroute link" which when clicked upon causes the status data in the database to indicate the crew is enroute to the assignment location. A link might be a "completed link" which when clicked upon causes the status in the database to indicate the assignment has been completed. A link may be a "rejected link" which when clicked upon causes the status data in the database to indicate the assignment has been rejected by the field crew. A link may be an "arrived link" which when clicked upon causes the status data in the database to indicate the field crew has arrived in the assignment location. Still another link may be a "cancel link" which when clicked upon causes no change to the status data in the database but which may close the web page. It should be noted that the "detailed assignment data HTML page" may contain other links. For example, a "refresh link" may be available which when clicked upon causes the data on the page to be updated.

The "detailed assignment data HTML page" may also comprise a "cause locator" link. When the "cause locator" link is clicked upon, a CGI or stored procedure via HTTP server 84 is executed which generates a "cause HTML form." When the "cause HTML form" is delivered to the web browser, a cause/equipment pop-up menu is displayed. FIG. 13 provides a view of an exemplary "cause HTML form" when displayed. This form allows field crew members to indicate the type of equipment that was damaged and the potential cause for the damage. The items listed in the cause or equipment categories are derived by querying database 82 on enterprise computing system 52. Thus, the items listed are not pre-loaded on the mobile field unit but are dynamically updated to fit the particular work order assignment. The "cause HTML form" also provides for the entry of related time information. In particular the form allows for entry of an estimated restore time and an estimated arrival time. When the mobile field crew completes and submits the "cause HTML form" the data is transferred to database 82. The database may be made available to a customer information system (CIS). Thus, customers may access the CIS and receive immediate notification of restore time. By this system and method, human element in communication is eliminated. The data is passed directly to the customer.

At step 366 the "detailed assignment data HTML page" is transmitted to mobile field unit 52. At step 368, which corresponds to step 312 of FIG. 5, the "detailed assignment data HTML page" is loaded and displayed in web browser 90.

Figure 14:
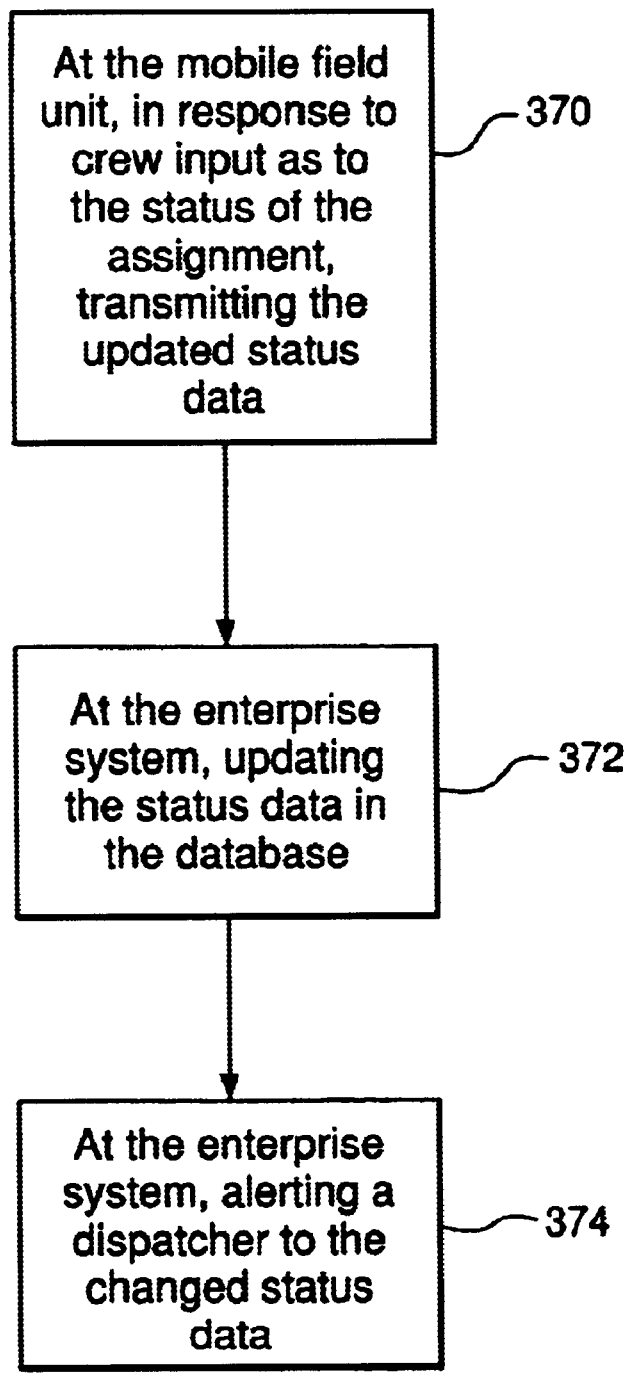
FIG. 14 is a flow diagram of a process in accordance with the present invention for updating assignment data in response to an action taken by a field crew.

FIG. 14 provides a detailed flow chart for step 314 of FIG. 5 for updating the "detailed assignment data" which is detailed data regarding the assignment that a field crew may be working on. At step 370 at mobile field unit 52 in response to crew input as to the status of the assignment, updated "detailed assignment data" is transmitted to enterprise computing system 50. At step 372 at enterprise computing system 50 the "detailed assignment data" is updated in database 82 to reflect the change. At step 374 the dispatcher is alerted as to the change in status of the assignment. The alert may be a notification sound and/or a visual notification such as a dialog box.

It should be noted that in the processes described with reference to FIGS. 6 through 13, stored procedures may be used at the initiation of HTTP server 84 to query the database and take other actions with respect to the steps described above. Furthermore, a common gateway interface (CGI) script may alternatively be initiated by HTTP server 84 to perform many of these same operations. An HTTP server 84 and stored procedure/CGI for taking some action relative to the data in database 82 may be identified by a uniform resource locator that is stored in a web page link. The (CGI) script may be written in the PERL scripting language and may access database 82 using PERL database interface (DBI) and/or PERL database driver (DBD). Based upon the queries to the database, the PERL script can generate HTML on the fly and deliver it to a field crew's web browser 90 via HTTP server 84. The PERL script can also update database records via DBI/DBD.

For many work orders, a sub map of the assignment area can be of great value. For example, when responding to a power outage, a map can show both the land base and electrical network. The state of the electrical network and exact location of outages and faults can be shown on the mar. Furthermore, according to the present invention, a crew member can click on objects in a map and obtain additional detailed information from enterprise computing system regarding that object.

Figure 15:
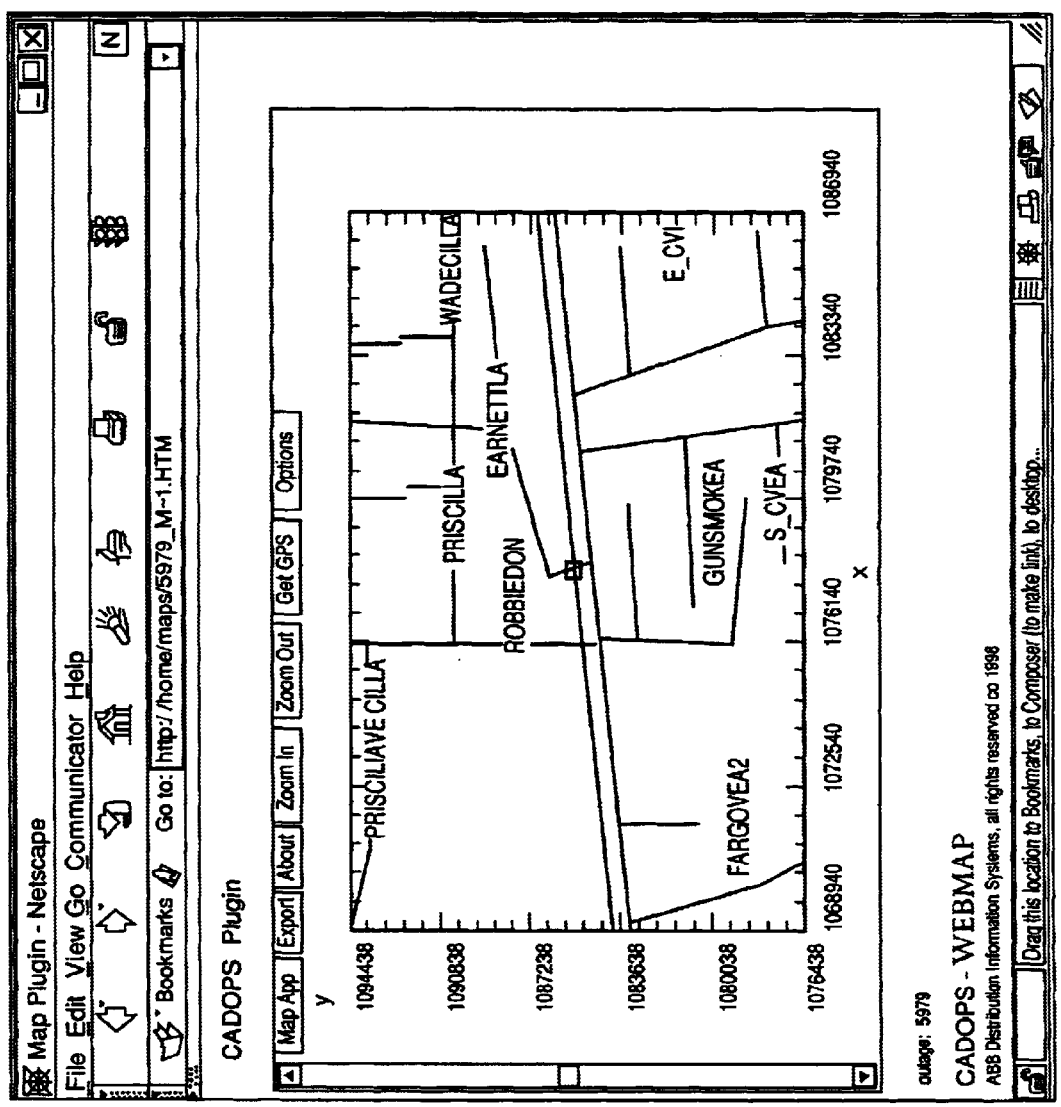
FIG. 15 is an illustration of an exemplary screen for displaying map data.

Referring back to FIG. 4, a field crew member may request map data of the work order work area by clicking on a button or appropriate link displayed on web browser 90. Requests for map data are transmitted (arrow 168) to HTTP server 84 and include the unique identifier of the work order. Using this work order identifier, HTTP server requests (arrow 170) and receives (arrow 172) the map files 146 and 148 that were previously developed and whose names include the work order identifier. HTTP server 84 transmits (arrow 174) the map data to web browser 90. When web browser 90 receives and loads HTML file 148, it encounters a link to .mpx file 146. The link to file 146 signals web browser 90 to load plug-in 94 (arrow 176) and display the map data composed in .mpx file 146 in a map area of web browser, 90. An exemplary screen with a map area of the type which might be displayed in web browser 90 is shown in FIG. 15.

It should be noted that plug-in 94 can capture via web browser 90 all point and click events within the window area generated by the plug-in. This is important for handling requests for data on objects displayed in the map. Further, plug-in 94 is operable to execute an HTTP post or get command to HTTP servers 84 in enterprise computing system 50. Also, plug-in 94 maintains a linked list of all map objects displayed in the map along with the unique identifiers for those objects. Thus, when a map object is clicked upon, the unique identifier for the object is readily retrieved from the linked list.

Generally, the crew is free to interact with the map and obtain more information about the objects on the map by simply clicking on the particular map object. For example, a crew member may click on a transformer to obtain more information about the transformer. By clicking on the transformer, a new browser window is launched with a new HTML page comprising additional information regarding the transformer. For example, the new page may contain the make and model of the transformer as well as the maintenance history of the transformer. The new page may contain links to even further information regarding the transformer. For example, the HTML page may contain links to all network information about transformers of the same type and make. Directions to the transformer might also be displayed.

Generally, when a crew member clicks on a map object, plug-in 94 obtains the click event and the device coordinates of the point which was clicked upon. Plug-in 94 transforms the device coordinates to user coordinates (such as state plane coordinates) and searches for the nearest map object within its linked list to the point which was clicked. A dialog box is presented to the crew with the unique identifier for the device which corresponds to the map object selected. The crew is given the choice to request more information or to cancel the dialog. If the crew selects to see more detailed information, plug-in 94 retrieves the URL including the CGI that it obtained as a parameter from html file 148. Note that because the URL and CGI are parameters in html file 148 which is downloaded from enterprise computing system 50, the URL is not hard-coded on mobile field unit 52 and can vary by the map that is displayed. Indeed, different map files 146 and 148 may point to different resources at enterprise computing system 50.

Plug-in 94 attaches the unique object ID for the selected map object to the URL and CGI and submits an HTTP post or get command to HTTP server 84. Server 84 delivers the object ID to the CGI or database stored procedure. In either case, the program queries database 82 and generates an HTML file on the fly to be displayed in a new window in the crew's browser 90. The HTML may be a form or can contain links so that the crew can obtain further information. A link may also allow a crew to update the data related to a map object. For example a link may allow a field crew to indicate that a device corresponding to map object has been repaired, replaced, closed, opened, or removed. The ability to update the data in database 82 on-line greatly reduces paper work and provides for accurate and up-to-date records.

Figure 16:
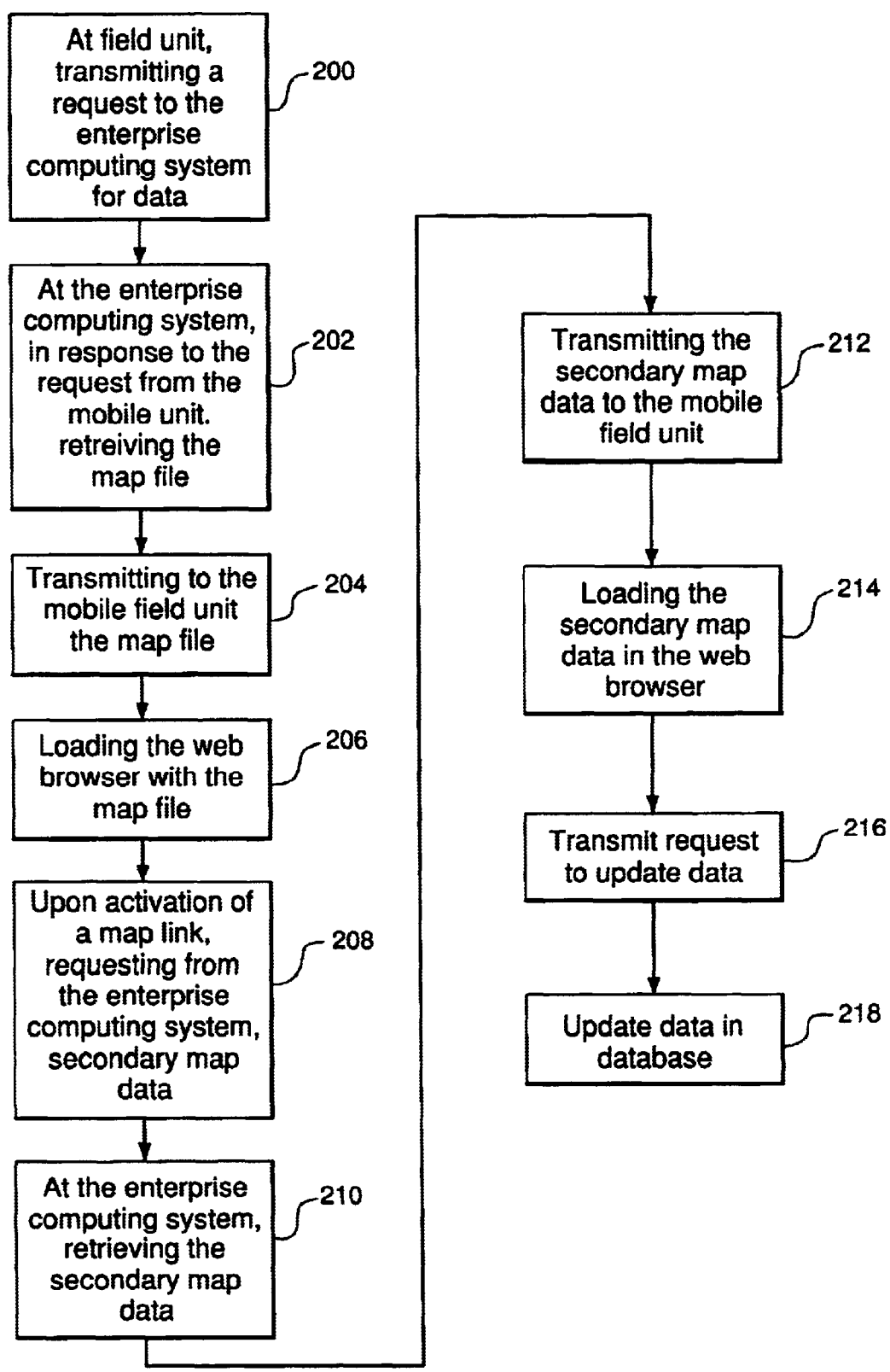
FIG. 16 is a flow diagram of a process in accordance with the present invention for gathering and displaying map data.

FIG. 16 provides a flow chart of the process of gathering and displaying the map data in the present invention. As shown, at step 200 in response to a field crew member requesting a map for a particular work order, a request is transmitted from web browser 90 to HTTP server 84. At step 202 HTTP server 84 uses the work order identification number to retrieve map data corresponding to the work order. As noted above, in one embodiment of the invention, map data comprises two files, one in HTML format and one in an ASCII format. These files may contain links to secondary map data which comprises further information about objects composed in the map. At step 204 the map data is transmitted to web browser 90. At step 206 web browser 90 loads the map data, possibly using plug-in 94 so as to display a map to the crew personnel. In response to crew personnel clicking on a map object located in the displayed map, at step 208 web browser 90 transmits a request to HTTP server 84 for secondary map data related to a particular item on the map. At step 210 HTTP server 84 transmits a request to database 82 for the additional data. Database 82 processes the request and returns the requested data to HTTP server 84. HTTP server 84 transmits the secondary map data to web browser 90 at step 212. Web browser 90 loads the data in a browser window at step 214. It should be noted that the secondary map data may comprise an HTML file comprising a plurality of links for retrieval of still additional information or even updating data. This HTML file may be referred to as a "secondary map data retrieval file."

As noted above, field crews may change the physical equipment located in the field. According to the present invention, the field crew may also change the data in the system to reflect any changes that may have been made to the physical network. Thus, the field crew may enter data at web browser 90, possibly using the "secondary map data retrieval file." Thus, at step 216, the web browser transmits to HTTP server 84 a request to update database 82 in enterprise computing system 50. At step 218, HTTP server 84 forwards the request to database server 82 which updates the data to reflect the changes made by the field crew.

Figure 17:
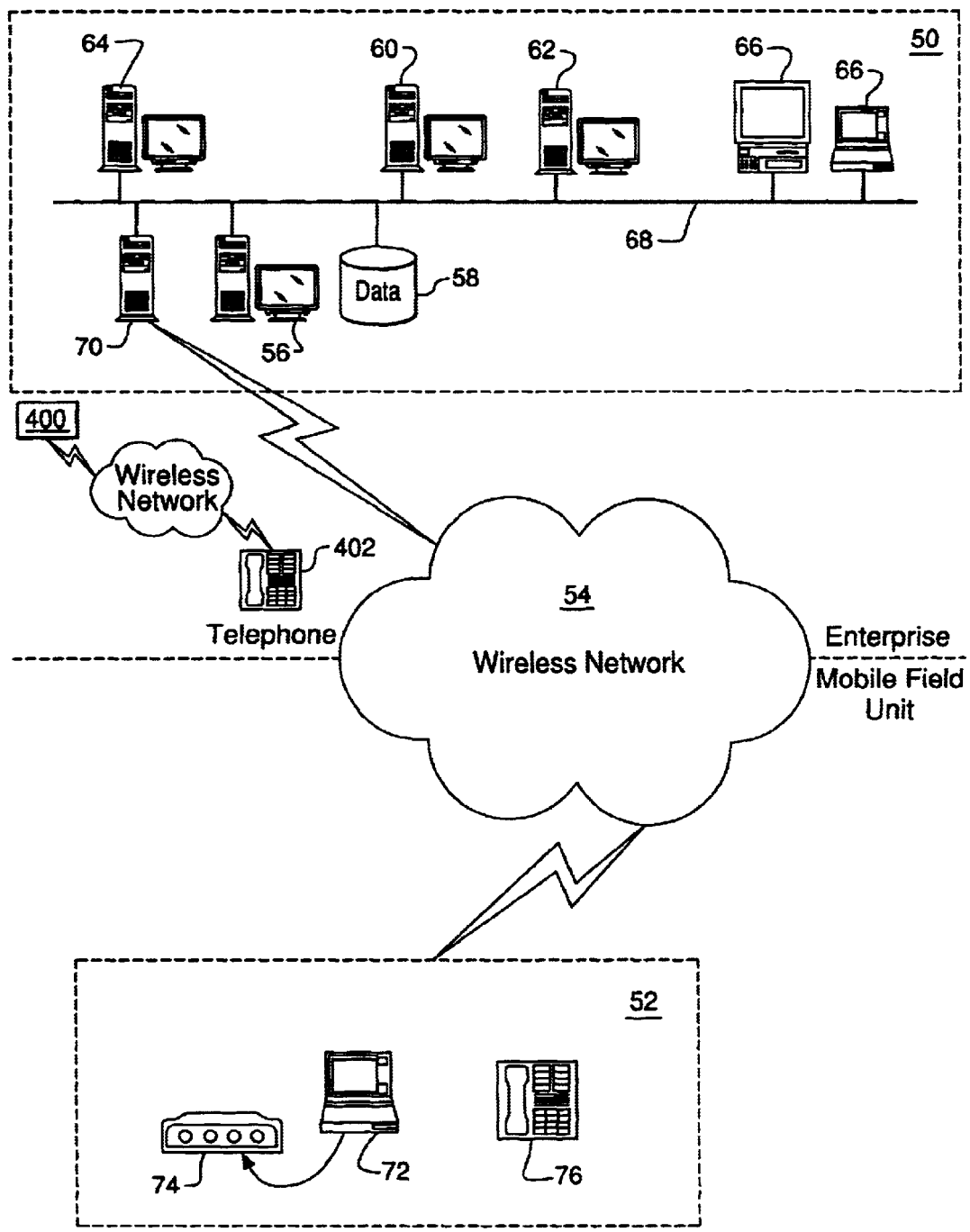
FIG. 17 is a schematic diagram of a system in accordance with the present invention in communication with a paging system and a digital personal communication system.

Another feature of the present invention involves monitoring of the assignment of work orders. When a work order is assigned to a field crew, the application through which the work order is being assigned not only connects to mobile field unit 52 but also transmits a packet of data to monitoring server 64 which comprises monitoring server software 85. Monitoring server 85 is updated to indicate whether a connection was successfully established with mobile server 86. A connection may not be established, for example, if mobile field unit 52 is out of range of wireless network 54. Monitoring server 85 stores an indication of whether a transmission was successful or not in database 82 or alternatively in a system file. Monitor server 85 may also send a notification, preferably via e-mail to a supervisor or dispatcher if a work order failed to successfully transmit to field unit 50. As shown in FIG. 17, enterprise computing system might also be connected to a paging system 400 and/or a digital personal communication system 402. Thus, notification of a transmission failure may also be sent to a dispatcher from monitoring server by a page or a message via the PCS system. The notification step is necessary so that the dispatcher can resort to alternative means for communicating with the desired field crew. Applications can query the monitoring database 82 to obtain reports on the state of assignments (failures or acceptance) and to also obtain reports on the state of the wireless network.

Figure 18:
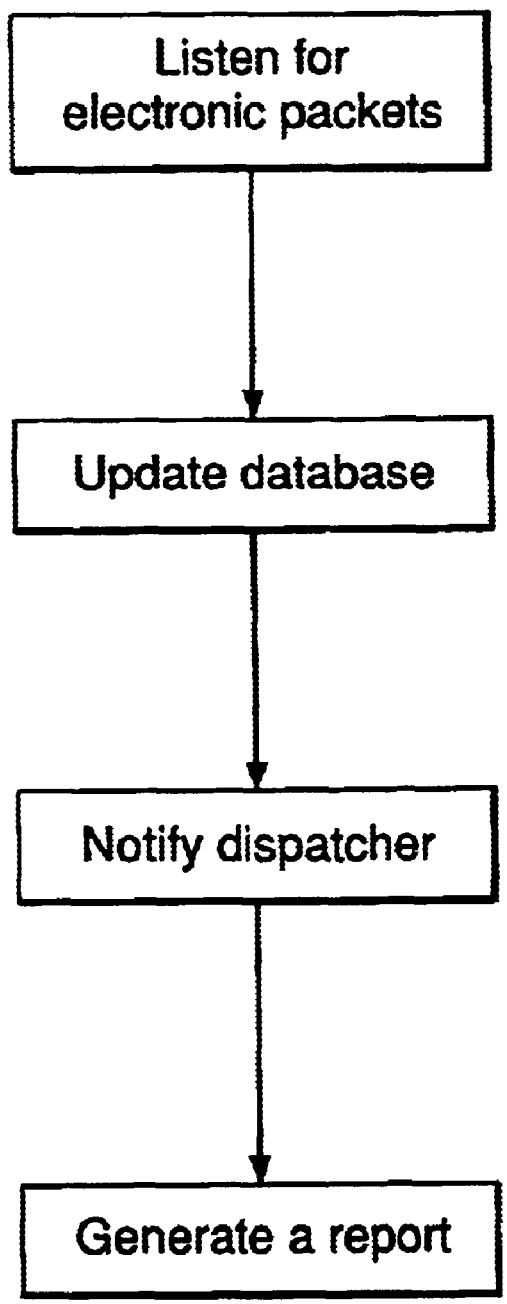
FIG. 18 is a flow diagram of a process in accordance with the present invention for monitoring work order assignment.

FIG. 18 provides a flow chart of a method for monitoring work order assignment. At step 220, the server listens at specified internet protocol address for electronic packets comprising the status of the transmission of a work order to the mobile field unit. Generally, the electronic packets comprise a unique identifier for the work order, an indication of the time the status was recorded, and the internet protocol address of the relevant mobile field unit. Monitor server may be configured to receive either UDP or TCP packets. At step 222 an entry is made in database 82 indicating whether or not the work order has been successfully been transmitted. At step 224 the dispatcher is notified if the transmission was not successful. Upon receipt of a request for a report from an application program, at step 226 monitor server 85 processes the request and generates a report which may be transmitted to the requesting application.

It should be noted that there are numerous advantages to the systems and methods in accordance with the present invention. Foremost of these is that propriety code does not need to be developed and deployed on mobile field unit 52. For example, code for displaying information in a window or in dialog box is not proprietary. Rather, all graphical user interfaces are built using HTML generated dynamically by a CGI or stored procedures at enterprise computing system 50. Thus, there is no need to write complex closed proprietary code for each mobile field unit 52 when an interface is changed or different data needs to be presented.

Furthermore, in a system in accordance with the present invention application programs 80 generate dynamic HTML based on data and the desired presentation (which can include pop up menus, text fields, check boxes, selection boxes, etc). These dynamically created HTML files are thereafter delivered to the mobile field unit. Thus, changes made at enterprise computing system 50 are reflected immediately at mobile field unit 52. This greatly facilitates deployment of new user interfaces and applications to large numbers of field units 52.

Thus, as described above the present invention provides systems and methods for low-cost, timely, two-way communications between a central enterprise systems and geographically distributed field personnel. The system comprises an enterprise computing system, a wireless network, and a mobile field unit. Communications are TCP/IP-based and can be carried over a public or private network using a variety of communications technologies. Communication between the enterprise computing system and the mobile field unit is completely automated (voice communication is the exception). Although this unique system offers operator/dispatch functionality, the need for operator/dispatcher assistance is minimized. In addition, mobile field crews can access information resources at the central operations level including work order and mapped vehicle location data and other pertinent information.

While the invention has been described and illustrated with reference to specific embodiments, those skilled in the art will recognize that modification and variations may be made without departing from the principles of the invention as described above and set forth in the following claims. In particular, the present invention has been explained with reference to an exemplary utility environment but may be employed in other environments such as maintenance service corporations, ambulance services, public safety systems or any other operation which communicates work orders to field personnel. Accordingly, reference should be made to the appended claims as indicating the scope of the invention.

What is claimed is:

1. A method for distributing work order assignment data to a field crew using a system having an enterprise computing system and at least one mobile field unit, comprising the following steps:
   (A) updating a database on the enterprise computing system to indicate an assignment has been assigned to the field crew;
   (B) notifying the field crew of the assignment;
   (C) in response to the input of field crew login data, verifying field crew identity;
   (D) notifying the field crew of successful login;
   (E) retrieving and presenting a list of assignments to the field crew;
   (F) in response to field crew input selecting an assignment from the list of assignments, retrieving detailed assignment data for the selected assignment;
   (G) displaying the detailed assignment data to the field crew; and
   (H) in response to field crew input identifying an action was taken with regard to the assignment, updating the detailed assignment data.

2. The method of claim 1 for distributing work order assignment data, wherein the step of notifying the field crew of the assignment further comprises the following steps:
   at the enterprise computing system, generating an alert HTML page;
   transmitting the alert HTML page and a command to open a web browser to the mobile field unit;
   at the mobile field unit, launching a web browser in response to the command and loading the web browser with the alert HTML file.

3. The method of claim 1 for distributing work order assignment data, wherein the step of verifying field crew identity, further comprises the following steps:
   at the mobile field unit, upon a field crew member clicking on a link in the alert HTML file, displaying a login form;
   at the mobile field unit, in response to a field crew entering login data, transmitting the login data to the enterprise computing system;
   at the enterprise computing system, querying a database to verify the login data is correct.

4. The method of claim 1 for distributing work order assignment data, wherein the step of notifying the field crew of successful login, further comprises the following steps:
   at the enterprise computing system, generating a successful login HTML page;
   at the enterprise computing system, generating a cookie having crew login data including a crew identifier;
   transmitting the successful login HTML page to the mobile field unit; and
   displaying the successful login HTML page in the web browser at the mobile field unit.

5. The method of claim 4 for distributing work order assignment, wherein the step of generating a cookie is performed by a common gateway interface.

6. The method of claim 4 for distributing work order assignment, wherein the step of generating a cookie is performed by a stored procedure that is invoked by an HTTP server.

7. The method of claim 4 for distributing work order assignment data, wherein the step of retrieving and presenting a list of assignments to the field crew, further comprises the following steps:
   at the mobile field unit, in response to a field crew member clicking on a continue link in the successful login HTML page, transmitting a request for a list of assignments;
   at the enterprise computing system, in response to the request for list of assignments, querying the database for assignments;
   at the enterprise computing system, generating an assignment HTML page;
   transmitting the assignment HTML page to the mobile field unit; and
   at the mobile field unit, loading the assignment HTML page into the web browser.

8. The method of claim 7 for distributing work order assignment data, wherein said assignment HTML page contains a list of assignments assigned to the field crew and assignment links to additional data in the database corresponding to each assignment.

9. The method of claim 7 for distributing work order assignment data, wherein each of the assignment links contains an assignment identifier for uniquely identifying the assignment.

10. The method of claim 7 for distributing work order assignment data, wherein the step of querying the database for assignments comprises the following steps:
    retrieving crew identifier data from the cookie;
    querying the database for assignments related to the crew identifier data.

11. The method of claim 7 for distributing work order assignment data, wherein the step of generating an assignment HTML page is performed by a common gateway interface.

12. The method of claim 7 for distributing work order assignment data, wherein the step of generating an assignment HTML page is performed by a stored procedure invoked by an HTTP server.

13. The method of claim 1 for distributing work order assignment data, wherein the step of retrieving detailed assignment data for an assignment in the list of assignments, further comprises the following steps:
    at the mobile field unit, in response to a crew member clicking on an assignment link in the assignment HTML page, transmitting a request for data related to the selected assignment;
    at the enterprise computing system, querying the database for assignment data related to the selected assignment;
    at the enterprise computing system, generating a detailed assignment data HTML page; and
    transmitting the detailed assignment data HTML page to the mobile field unit.

14. The method of claim 13 for distributing work order assignment data wherein the assignment data HTML page has a plurality of HTML status links each of which when clicked upon causes a different update to the status data of the assignment in the database.

15. The method of claim 14 for distributing work order assignment data wherein one of said plurality of HTML status links is an accepted link which when clicked upon causes the status data in the database to indicate the assignment has been accepted.

16. The method of claim 14 for distributing work order assignment data wherein one of said plurality of HTML status links is an enroute link which when clicked upon causes the status data in the database to indicate the crew is enroute to the assignment location.

17. The method of claim 14 for distributing work order assignment data wherein one of said plurality of HTML status links is a completed link which when clicked upon causes the status data in the database to indicate the assignment has been completed.

18. The method of claim 14 for distributing work order assignment data wherein one of said plurality of HTML status links is a rejected link which when clicked upon causes the status data in the database to indicate the assignment has been rejected by the field crew.

19. The method of claim 14 for distributing work order assignment data wherein one of said plurality of HTML status links is an arrived link which when clicked upon causes the status data in the database to indicate the field crew has arrived at the assignment location.

20. The method of claim 14 for distributing work order assignment data wherein one of said plurality of HTML status links is a cancel link which when clicked upon causes the status data in the database to not be updated.

21. The method of claim 13 for distributing work order assignment data wherein the assignment data HTML page comprises a refresh link which when clicked upon causes all of the data displayed in the assignment data HTML page to be refreshed.

22. The method of claim 13 for distributing work order assignment data wherein the assignment data HTML page comprises a cause locator link which when clicked upon causes a cause HTML form to be displayed and into which data may be entered related to the cause of an outage.

23. The method of claim 13 for distributing work order assignment data, wherein said step of querying the database for assignment data is initiated by a common gateway interface.

24. The method of claim 13 for distributing work order assignment data, wherein said step of querying the database for assignment data is initiated by a stored procedure executed by an HTTP server.

25. The method of claim 1 for distributing work order assignment data to field crews using a system having an enterprise computing system and at least one mobile field unit, wherein the step of updating the detailed assignment, further comprises the following steps:

at the mobile field unit, in response to a crew member clicking on an HTML status link in the assignment status HTML page, transmitting updated status data;

at the enterprise system, updating the status data in the database;

at the enterprise system, alerting a dispatcher as to the change in status data.

26. The method of claim 25 for distributing work order assignment data, wherein the step of alerting a dispatcher as to change in status data comprises generating a sound to draw the attention of a dispatcher to the change in status data.

27. The method of 25 for distributing work order assignment data, wherein the step of alerting a dispatcher as to change in status data comprises generating a dialog box to draw the attention of a dispatcher to the change in status data.

* * * * *

UNITED STATES PATENT AND TRADEMARK OFFICE
CERTIFICATE OF CORRECTION

PATENT NO.    : 6,633,900 B1
DATED         : October 14, 2003
INVENTOR(S)   : Amir Khalessi and Sasan H. Ardalan It is certified that error appears in the above-identified patent and that said Letters Patent is hereby corrected as shown below:

<u>Column 11,</u>
Line 63, "mar" should read -- map --.

Signed and Sealed this

Second Day of December, 2003

JAMES E. ROGAN
*Director of the United States Patent and Trademark Office*